Figure 1:
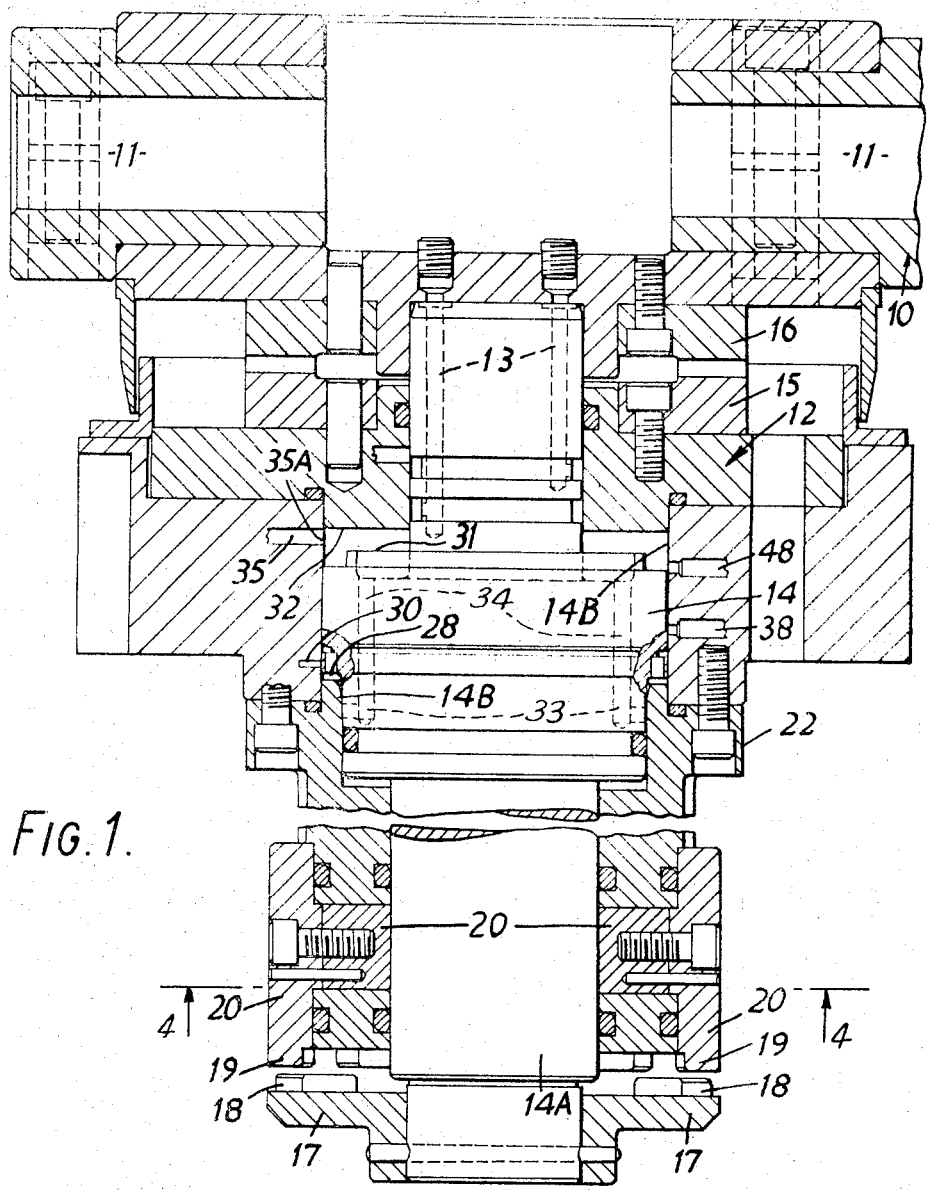

United States Patent [19]

Boyd et al.

[11] 3,782,226

[45] Jan. 1, 1974

[54] MACHINE TOOLS

[75] Inventors: Gordon A. Boyd, Dorking; Franz Berger, West Wickham, both of England

[73] Assignee: Autologic Limited, Surrey, England

[22] Filed: Jan. 25, 1971

[21] Appl. No.: 109,284

[30] Foreign Application Priority Data

Feb. 3, 1970 Great Britain..................... 5,200/70

[52] U.S. Cl.................................. 74/821, 74/826
[51] Int. Cl............................................ B23b 29/32
[58] Field of Search..................... 74/826; 82/36 A; 279/5

[56] References Cited
UNITED STATES PATENTS

| | | | |
|---|---|---|---|
| 2,979,971 | 4/1961 | Darash............... | 74/826 X |
| 3,204,490 | 9/1965 | Jones et al........... | 74/826 X |
| 3,242,771 | 3/1966 | Maier et al........... | 74/826 |
| 3,593,597 | 7/1971 | Jennings.............. | 74/826 X |

Primary Examiner—Charles J. Myhre
Assistant Examiner—F. D. Shoemaker
Attorney—David A. Maxon

[57] ABSTRACT

A tool turret assembly for a machine tool which is movable to present different tools at an operating station. The tool turret mounted on an operating member which is rotatable between tool presenting positions and is also axially displaceable. The operating member is adapted to engage respectively in its axially displaced positions, members for rotating the turret through an angle corresponding to the angle between tool presenting positions, and members for accurately locating the turret in its tool presenting positions. A hydrostatic bearing is provided under the operating member during rotation. Axial displacement is collinear with the axis of rotation of the members for rotating the turret.

19 Claims, 5 Drawing Figures

INVENTORS
GORDON A. BOYD
FRANZ BERGER

BY David A. Maxon
ATTORNEY

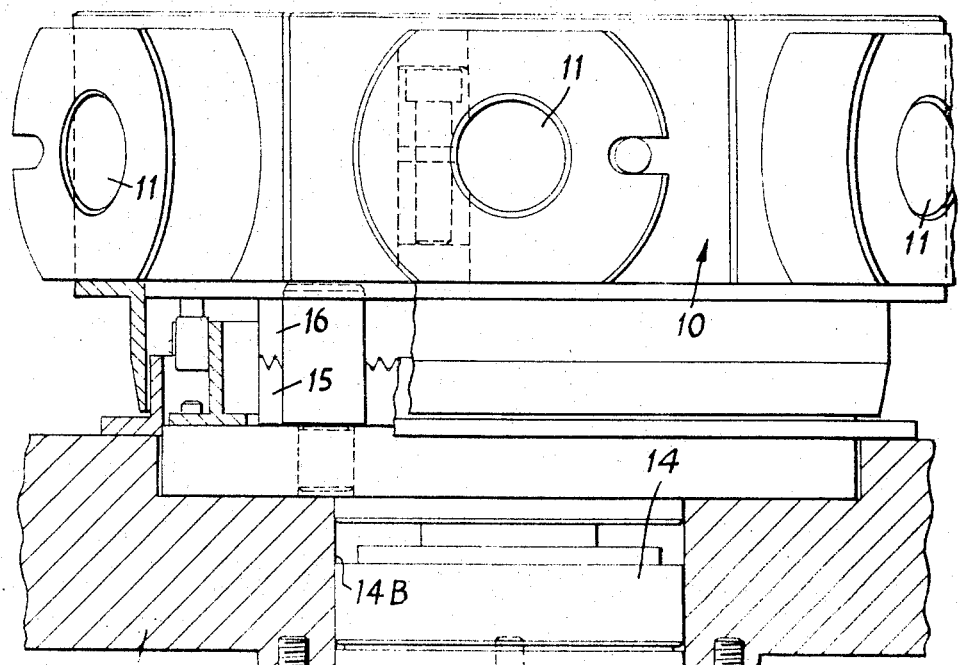
FIG.3.
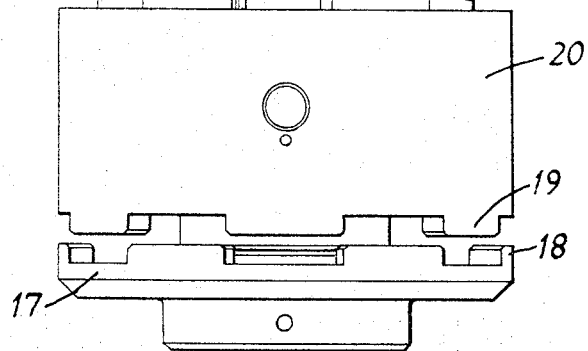
INVENTORS
GORDON A. BOYD
FRANZ BERGER
BY David A. Mason
ATTORNEY INVENTORS
GORDON A. BOYD
FRANZ BERGER
BY David A. Maxon
ATTORNEY

MACHINE TOOLS

This invention relates to machine tools and is more particularly concerned with a tool turret assembly for a machine tool.

A tool turret assembly for a machine tool according to the present invention comprises a turret head arrangement to be movable to present different tools at an operating station and mounted on an operating member which is rotatable and axially displaceable to engage respectively in axially displaced positions means for accurately locating the turret in a tool presenting position and means for rotating the turret through an angle corresponding to the angle between the tool presenting positions.

The operating member preferably includes a piston slidable in a cylinder for effecting the axial movement, and the piston is conveniently arranged to engage rotary means for rotating it to rotate the turret through the required angle. To this end the piston may be provided with a face gear adapted to engage a face gear on the rotary means. In one construction face gears may be in the form of a dog clutch.

The rotary means is conveniently hydraulically actuated and may comprise one of more movable radial vanes arranged for movement in a housing through angles corresponding to the angles through which the turret is to be indexed. These moving vanes may also be arranged to be returnable to their initial position.

The rotary means and the piston and cylinder are preferably interconnected in a hydraulic power circuit which conveniently is arranged to be operable under the action of a solenoid-operated change-over valve.

In addition, a hydrostatic bearing may be provided between the face of the piston and the corresponding end of the cylinder with which it co-operates during rotation. The bearing may be maintained by hydraulic fluid passing through passages in the piston.

In order that the assembly can be mounted in a confined space the rotary means and the piston and cylinder assembly are conveniently located adjacent one another with the rotary means preferably surrounding the piston and located between the turret head and the end of the piston remote therefrom.

The passages in the piston may be formed to communicate with the space below the piston to which pressure fluid is supplied to raise the piston. In addition, restrictor valves may be provided in the passages to control the hydrostatic pressure.

The means for accurately locating the turrets in its indexed positions may comprise interengaging face gears on the turret and the operating member. The interengaging face gears are conveniently formed by hirth rings and where the turret is to be indexed through 60° for each tool presenting position they conveniently have 96 teeth.

Figure 2:
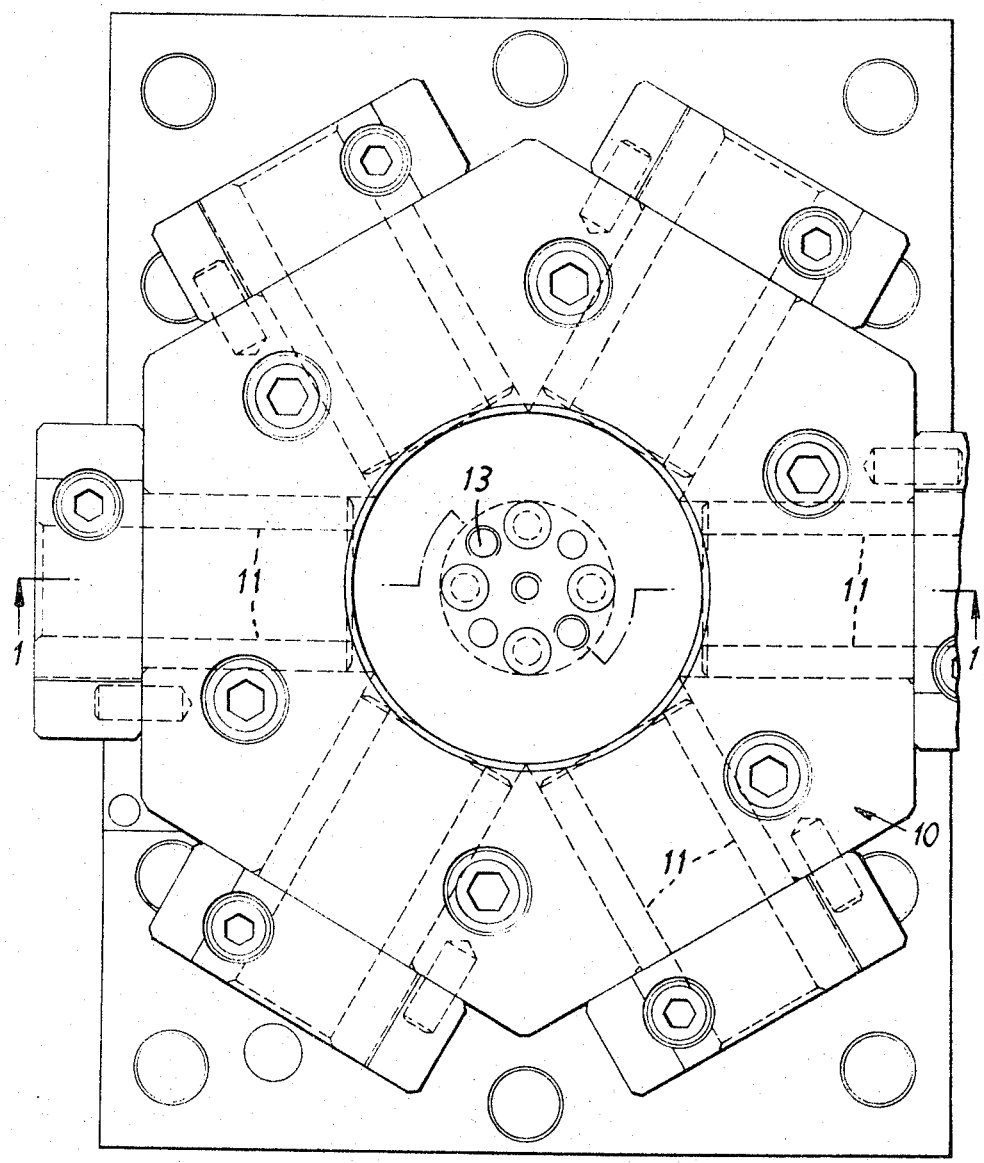
Figure 4:
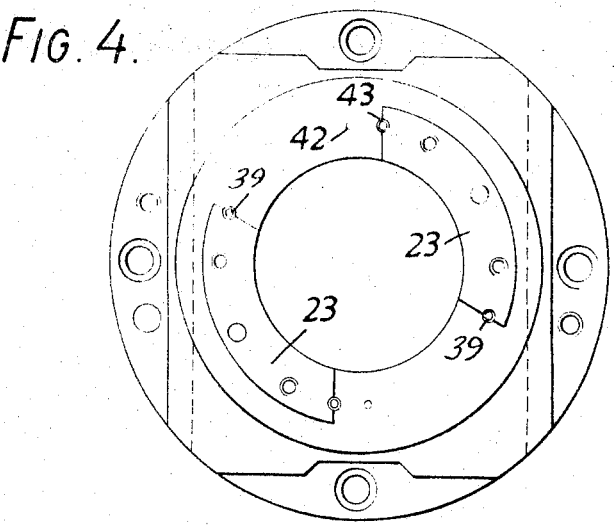
Figure 5:
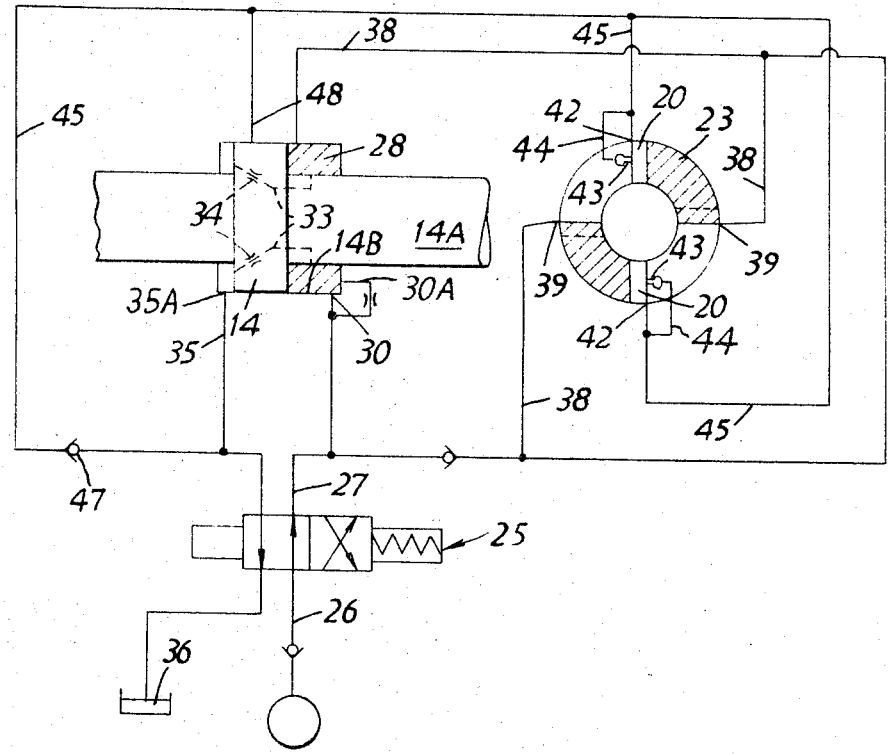

The invention may be performed in various ways and one specific embodiment will now be described by way of example with reference to the accompanying drawings, in which:

FIG. 1 is a cross-section through a turret assembly according to the present invention in the turret locked position taken on the line 1—1 of FIG. 2, FIG. 2 is a plan view of the assembly shown in FIG. 1, FIG. 3 is a side elevation of the arrangement shown in FIG. 1, FIG. 4 is a cross-section along section lines 4—4 of FIG. 1 through the lower half of the assembly showing the fixed vanes, and FIG. 5 is a circuit disgram showing the hydraulic circuits.

The tool turret assembly shown in FIG. 1 comprises a hexagonal turret head indicated generally at 10 having six openings 11 in it within which can be secured tools (not shown) in conventional manner. The turret head 10 is mounted for axial movement in a body indicated generally at 12. The turret head 10 is rigidly connected by means of dowel-pins 13 to a piston assembly indicated generally at 14 and slidable in a cylinder 14B. Fixed to the upper side of the body 12 is a hirth ring 15 (i.e., a ring in the form of a face gear, having in this case 96 accurately formed teeth) designed to engage in the lower position of the turret with a mating hirth ring 16 secured to the lower side of the turret head. The piston is provided on its underside with an extension 14A which has secured to its lower end a flange 17. The flange 17 has mounted on its upper face teeth 18 arranged to engage corresponding teeth 19 in a moving vane 20 and which when engaged form a dog clutch arrangement as more fully described hereafter.

The turret and the piston are axially slidable in the body within limits defined, in its uppermost position by a hydrostatic bearing system incorporated into the end of the piston and cylinder body and which is more fully described below and which limits the movement of the piston in the body and in its lowermost position, by the engaging hirth rings 15 and 16. In the uppermost position the turret can be indexed through one position as described below while in the lowermost position it is fixed in position for a machining operation.

The lower part of the assembly comprises a vane housing indicated at 22 in which are mounted fixed vanes 23 as well as the moving vanes 20 and the turret is arranged to be indexed through one position by means of the moving vanes.

The turret is arranged to be indexed by energising a solenoid valve indicated diagrammatically in FIG. 5 at 25. This admits pressure fluid from a fluid pressure line 26 into a line 27 communicating with the space underneath the piston indicated at 28 through a port 30. This causes the piston and the turret head 10 to be raised and the hirth rings 16 disengage from the hirth rings 15 at the same time the dog clutch teeth 18 on the flange 17 engage with the teeth 19 on the vane body. The piston is raised until its upper face 31 comes into close proximity with the lower surface 32 of the upper end of the cylinder 14B. The two surfaces are prevented from engagement by a hydrostatic bearing which is formed by bores 33 which extend through the piston and communicate with the space 28 at their lower end and which open at their upper ends into the upper face 31 of the piston. Also provided in the bores are restrictor valves 34 arranged to ensure that the correct hydraulic pressure is applied to the upper surface. A drain passage 35 leads from the space between the upper surfaces of the piston and the lower surface 32 and leads through the solenoid valve to a reservoir indicated at 36.

In addition to the passage 27 leading to the space 28 there is also a passage 38 which communicates with the space 28 and which is uncovered by the piston in its travel upwardly in the cylinder, the passage 38 leading to one end of the fixed vane indicated diagrammatically in FIG. 5 also designated in this figure by the numeral 23. This passage 38 admits fluid, after the piston has travelled a predetermined distance, into the vane body via ports 39 thus causing the moving vanes 20 to traverse through 60° and since the dog clutch is engaged the turret will also be moved and thus indexed through 60°. In order that the moving vanes shall not engage the fixed vanes rapidly two drain ports are provided in each fixed vane one indicated at 42 and the other indicated at 43 (FIG. 4), and through which fluid passes to exhaust. The drain port 42 is covered by the moving vane after travelling a predetermined distance and the remainder of the fluid then has to pass through the port 43 which is positioned at the end of its travel and which communicates with a restricted passage 44 so that the rate of movement will be considerably reduced. The restricted passage 44 communicates with a passage 45 and is lead away via passage 45 to the sump through the non-return valve 47.

After the turret has been moved the required distance and the moving vanes have completed their movement the solenoid is de-energised and moves the change-over valve into its other position. This causes fluid to flow across the valve into the passage 35 and thence through a port 35A into the space above the piston to lower the piston, the check valve 47 preventing fluid from flowing past it. At the same time the fluid is permitted to drain out from the space 28 through ports 30 and into passages 27 which now communicate with the reservoir. The piston is then lowered with fluid flowing out through the port 30 until this port is covered when it has to return through a restricted passage 30A, so as to slow its movement down at the end of its stroke. On this return stroke the restricted passages 33 in the piston are covered before the piston reaches the end of its stroke, thus preventing leakage. When the piston reaches the end of its stroke the hirth rings 15 and 16 re-engage and the dog clutch disengages and the turret is fully indexed. At this point a port 48 is uncovered which admits fluid into the passages 45 and hence serves to return the moving vanes to their original position for a further indexing operation to take place, the passages 38 being open to exhaust. The solenoid remains energized for a time interval 15 percent greater than the time taken to lift and index the turret so that the vanes return to their original position.

The actual location of the turret in each of its indexed positions is determined very accurately by the hirth rings and is not dependent on the positioning accurately of the moving and fixed vanes. Also the hydrostatic bearing set up by the passages in the piston enables indexing to be accomplished with a minimal frictional drag.

What we claim as our invention and desire to secure by Letters patent of the United States is:

1. A tool turret assembly for a machine tool comprising:
    a turret head arranged to be movable to present different tools at an operating station;
    an axially movable operating member;
    said turret head being mounted on said operating member;
    means for accurately locating said turret in tool presenting positions;
    means for rotating said turret through an angle corresponding to the angle between the tool presenting positions;
    said operating member operable to engage said locating means and said rotating means respectively in axially displaced positions;
    said operating member comprising a piston sliding in a cylinder operable to cause said axial movement;
    means comprising imcompressible fluid applied to a face of the piston causing movement of the piston;
    and a hydrostatic bearing operative during rotation provided between another face of the piston and the end of the cylinder remote from said first-mentioned face.

2. A tool turret assembly as claimed in claim 1 in which said piston is provided with a face gear to engage another face gear on said means for rotating.

3. A tool turret assembly as claimed in claim 2 in which the face gears are in the form of a dog clutch.

4. A tool turret assembly as claimed in claim 1 wherein said means for rotating is hydraulically actuated and said piston acts as a valve member controlling the flow of fluid to said means for rotating.

5. A turret assembly as claimed in claim 4 in which said means for rotating comprises a movable radial vane arranged for movement in a housing through angles corresponding to the angles through which the turret is indexed.

6. A tool turret assembly as claimed in claim 5 wherein said moving vane is arranged to be returnable to an initial position.

7. A tool turret assembly as claimed in claim 1 in which said means for rotating and the piston and cylinder are interconnected in a hydraulic power circuit.

8. A tool turret assembly as claimed in claim 7 in which the hydraulic circuit is arranged to be operable under the action of a solenoid operated change-over valve.

9. A tool turret assembly as claimed in claim 1 in which said means for rotating and said piston and said cylinder are in a common assembly and are located adjacent to one another.

10. A tool turret assembly as claimed in claim 9 in which said means for rotating surrounds said piston and is located between the turret head and the end of said piston remote therefrom.

11. A tool turret assembly as claimed in claim 1 wherein said piston has passages and said bearing is maintained by hydraulic fluid passing through said passages.

12. A tool turret assembly as claimed in claim 11 in which the passages in said piston are formed to communicate with the space below the piston to which hydraulic fluid is supplied to raise the piston.

13. A tool turrest assembly as claimed in claim 12 in which restrictor valves are provided in the passages to control the hydrostatic pressure.

14. A tool turret assembly as claimed in claim 1 wherein said means for accurately locating said turret comprises interengaging face gears on said turret and said operating member.

15. A tool turret assembly as claimed in claim 14 in which the interengaging face gears are formed by hirth rings.

16. A tool turret assembly as claimed in claim 15 in which the turret is arranged to be indexed through 60° for each tool presenting position and the hirth rings have 96 teeth.

17. A tool turret assembly as claimed in claim 1 having means for damping rotation of said turret proximate terminal positions of rotation of the turret through said angle corresponding to the angle between the tool presenting positions.

18. A tool turret assembly for a machine tool comprising:
- a turret head arranged to be movable to present different tools at an operating station;
- an axially movable operating member;
- said turret head being mounted on said operating member;
- means for accurately locating said turret in predetermined rotatably displaced positions;
- means for rotating said turret through an angle corresponding to the angle between tool presenting positions;
- said operating member operable to engage said locating means and said rotating means respectively in axially displaced positions;
- said operating member comprising a piston sliding in a cylinder operable to cause said axial movement;
- and a hydrostatic bearing operative during rotation provided between a face of the piston and said operating member.

19. A tool turret assembly for a machine tool comprising:
- a turret head arranged to be movable to present different tools at an operating station;
- an axially movable operating member;
- said turret head being mounted on said operating member;
- means for accurately locating said turret head in predetermined rotatably displaced positions;
- said rotatably displaced positions precisely corresponding to tool presenting positions of said turret wherein said rotatably displaced positions are displaced from one another by an angle precisely corresponding to the angle between tool presenting positions;
- said angle between tool presenting positions being precisely the same between any pair of adjacent tool presenting positions as for any other pair of adjacent tool presenting positions;
- means for rotating said turret through an angle corresponding to the angle between tool presenting positions;
- said operating member operable to engage said locating means and said rotating means respectively in axially displaced positions;
- said operating member comprising a piston sliding in a cylinder operable to cause said axial movement
- said means for rotating having rotatable elements rotating about the central axis of said piston and being independent of and unengagable with any mechanical linkages and any mechanical parts rotating about an axis that is not coaxial with said piston.

* * * * *